US006605670B1

(12) United States Patent
Durairaj et al.

(10) Patent No.: US 6,605,670 B1
(45) Date of Patent: Aug. 12, 2003

(54) RESORCINOLIC DERIVATIVES AND METHODS OF MAKING AND USING THE SAME

(75) Inventors: Raj B. Durairaj, Monroeville, PA (US); Mark A. Lawrence, New Kensington, PA (US)

(73) Assignee: Indspec Chemical Corporation, Pittsburgh, PA (US)

( * ) Notice: Subject to any disclaimer, the term of this patent is extended or adjusted under 35 U.S.C. 154(b) by 0 days.

(21) Appl. No.: 09/993,140

(22) Filed: Nov. 6, 2001

(51) Int. Cl.[7] .............................................. C08L 71/12
(52) U.S. Cl. ................ 525/132; 525/331.9; 525/332.6; 525/149; 524/394; 524/432; 524/492; 524/495; 524/494; 546/291; 540/485; 548/578; 548/577
(58) Field of Search ................................ 525/132, 149, 525/331.9, 332.6; 156/210, 211, 217; 524/495, 430, 394, 492, 494

(56) References Cited

U.S. PATENT DOCUMENTS

| 3,073,843 | A |   | 1/1963  | Buc |
|-----------|---|---|---------|-----|
| 3,897,583 | A | * | 7/1975  | Bellamy ..................... 428/256 |
| 3,992,334 | A | * | 11/1976 | Harvey ........................... 260/3 |
| 4,476,262 | A |   | 10/1984 | Chu et al. |
| 4,605,696 | A |   | 8/1986  | Benko et al. |
| 4,731,430 | A |   | 3/1988  | Kempter et al. |
| 4,769,454 | A |   | 9/1988  | Blank et al. |
| 4,889,891 | A | * | 12/1989 | Durairaj et al. ............. 525/139 |
| 4,892,908 | A |   | 1/1990  | Durairaj et al. |
| 5,021,522 | A |   | 6/1991  | Durairaj et al. |
| 5,030,692 | A |   | 7/1991  | Durairaj |
| 5,049,641 | A |   | 9/1991  | Hood et al. |
| 5,229,459 | A | * | 7/1993  | Sandstrom et al. ......... 525/136 |
| 5,244,725 | A |   | 9/1993  | Dressler et al. |
| 5,300,618 | A | * | 4/1994  | Durairaj ..................... 528/101 |
| 5,688,871 | A | * | 11/1997 | Inui et al. ................... 525/346 |
| 5,936,056 | A | * | 8/1999  | Durairaj et al. ............... 528/96 |
| 5,945,500 | A |   | 8/1999  | Durairaj et al. |

OTHER PUBLICATIONS

Christjanson, P.; Siimer, K. Chem. Scr. 1981, 18(4), 163–168 (Abstract in English).*

* cited by examiner

Primary Examiner—David W. Wu
Assistant Examiner—Rip A Lee
(74) Attorney, Agent, or Firm—Debra Z. Anderson; Eckert Seamans Cherin & Mellott, LLC

(57) ABSTRACT

Methods of making low molecular weight methylene acceptors are provided. The methylene acceptors are prepared by reacting a polyhydric phenol with an aromatic olefinic compound in the presence of an acid catalyst, and then further reacting the products of the first reaction with an N-methylol lactam derivative. Derivatives made by the above method, as well as rubber compositions using these derivatives are also provided.

17 Claims, No Drawings

RESORCINOLIC DERIVATIVES AND METHODS OF MAKING AND USING THE SAME

FIELD OF THE INVENTION

This invention relates to improved methylene acceptors having a low molecular weight, a low free resorcinol content, and a low softening point. The derivatives of the present invention provide low fuming and low viscosity in the uncured rubber compound, good adhesion for steel cord, high dynamic storage modulus in the cured rubber product and ease of processing. In addition, they are non-hazardous to produce.

BACKGROUND INFORMATION

Resorcinol (molecular weight 110; melting point 110° C.) has long been used in the rubber industry as a reinforcing and bonding agent to promote adhesion between steel wire and rubber compounds. Resorcinol is referred to as a methylene acceptor because it reacts with a methylene donor, a compound that generates methylene or methylol groups capable of crosslinking with the methylene acceptor. The methylene donor and methylene acceptor crosslink during rubber processing to form in situ a resin that promotes adhesion of the rubber to reinforcing materials such as metal wire, glass, organic filaments, fibers, cords and fabrics.

Because it is a small molecule, resorcinol can become uniformly distributed among the rubber molecules during compounding with rubber, resulting in an uncured rubber mixture that exhibits very low viscosity. This is a desirable property, as it results in greater ease of processing and extrusion of the uncured rubber. However, even though resorcinol provides excellent physical, mechanical and steel adhesion properties in the uncured and cured rubber products, fuming associated with resorcinol at rubber processing temperatures causes problems, particularly with loss of product. For example, slight variations in the processing temperature can result in variations in the amount of resorcinol in, and properties of, the end product.

To overcome the resorcinol fuming problem, derivatives of resorcinol have been used as methylene acceptors in rubber processing. Various resorcinol-formaldehyde resins which can act as suitable methylene acceptors have also been developed, reducing the free resorcinol content and the associated resorcinol fuming. See, for example, the following related patents:

U.S. Pat. No. 4,476,262 discloses a water dilutable resinous product prepared by reacting together a resin, an aldehyde and a sulfurous or organic acid.

U.S. Pat. No. 4,605,696 discloses use of monoesters of resorcinol, including resorcinol monobenzoate and resorcinol monorosinate, in rubber compositions.

U.S. Pat. No. 4,731,430 discloses phenol resins modified with compounds possessing amide and/or imide groups that are useful as crosslinking agents and in the preparation of adhesives and rubber assistants.

U.S. Pat. No. 4,889,891 discloses alkyl substituted resorcinolic novolak resins as suitable methylene acceptors for vulcanizable rubber compositions.

U.S. Pat. No. 4,892,908 discloses the use of keto derivatives of resorcinol, such as benzoyl resorcinol, as methylene acceptors in vulcanizable rubber compositions.

U.S. Pat. No. 5,021,522 discloses aralkyl substituted resorcinolic novolak resins including a styrene substituted resorcinol-formaldehyde resin.

U.S. Pat. No. 5,030,692 discloses alkylphenol modified resorcinolic novolak resins.

U.S. Pat. No. 5,244,725 discloses a vulcanizable rubber composition that includes a rubber compound, a methylene donor and a methylene acceptor.

One problem with resorcinol-formaldehyde resins is diminished rubber compounding properties because the formaldehyde molecule contains two sites of reactivity. Formaldehyde will crosslink two resorcinol molecules, resulting in a higher molecular weight resin. Resorcinol resins of higher molecular weight have less reactive sites with which to crosslink the methylene donor, do not disperse as well in the rubber, and increase the viscosity of the uncured rubber.

Other methods of producing resorcinolic resins, such as by adding styrene to resorcinol before reaction with formaldehyde, or by using an epoxy reaction followed by styrenation, have been attempted. The methylene acceptors produced by these methods are of relatively high molecular weight, and have the problems mentioned above. None have achieved the desired product or processing properties in combination with low molecular weight, low fuming and low free resorcinol content.

SUMMARY OF THE INVENTION

The present invention solves the above need by providing a method of making a low molecular weight methylene acceptor having physical and mechanical properties similar to resorcinol, but without the fuming problems, for use in rubber processing. The methylene acceptor is prepared by reacting a polyhydric phenol with an aromatic olefinic compound in the presence of an acid catalyst to produce a first reaction product, and then further reacting the first reaction product with a monofunctional compound which is an N-methylol lactam derivative, such as propiolactam, butyrolactam, valerolactam, caprolactam, and heptalactam. The resulting methylene acceptor has a low molecular weight, low softening point, and a low free resorcinol content. Additional advantages include the formation of water as a by-product, as compared with by-products such as alcohol or other organic compounds produced in prior art methods, and the absence of a need for a co-solvent such as xylene or toluene. The method of the present invention can use existing plant conditions, without the need for re-engineering. Derivatives produced by the above-described method are also provided in the present invention.

The present invention further provides a rubber composition comprising: (a) a rubber compound; (b) a methylene donor; and (c) a methylene acceptor; the methylene acceptor is prepared by reacting a polyhydric phenol with an aromatic olefinic compound in the presence of an acid catalyst to produce a first reaction product, and then further reacting the first reaction product with an N-methylol lactam derivative, such as propiolactam, butyrolactam, valerolactam, caprolactam, and heptalactam, to produce a second reaction product which is the methylene acceptor. Rubber compositions further comprising a reinforcing material are also provided by the present invention.

It is an object of the present invention, therefore, to provide a low molecular weight methylene acceptor.

It is an additional object of the present invention to provide styrenated (polyhydroxy N-benzyl) lactam derivatives.

It is an additional object of the present invention to provide a methylene acceptor with low free resorcinol content to reduce fuming during rubber processing.

It is a further object of the present invention to provide a methylene acceptor which is a low melting solid, to improve ease of processing and handling.

It is another object of the present invention to provide a methylene acceptor with bulkier substituents to provide high dynamic storage modulus in the cured rubber compound.

It is an additional object of the present invention to provide a methylene acceptor made by a simple and non-hazardous process.

These and other objects of the invention will be more fully understood from the following description of the invention and the claims appended hereto.

DETAILED DESCRIPTION OF PREFERRED EMBODIMENTS

The present invention provides a method of making a low molecular weight methylene acceptor comprising reacting about 1.0 mole of a polyhydric phenol with about 0.1–1.2 moles of an aromatic olefinic compound in the presence of an acid catalyst to produce a first reaction product, and further reacting this first reaction product with about 0.1–1.2 moles of an N-methylol lactam derivative, such as propiolactam, butyrolactam, valerolactam, caprolactam, and heptalactam, to produce a second reaction product which is the methylene acceptor of the present invention. Thus, the molar ratio of polyhydric phenol:aromatic olefin:N-methylol lactam derivative is about 1:0.1–1.2:0.1–1.2.

As used herein, the term "low molecular weight methylene acceptor" refers to the second reaction product, made as described above, which includes derivatives of the polyhydric phenol which are lower in molecular weight than the commonly used resorcinol-formaldehyde resins. The second reaction product will comprise a blend of compounds, including a styrenated polyhydric phenol - lactam derivative, a non-styrenated polyhydric phenol - lactam derivative, a styrenated polyhydric phenol, and unreacted polyhydric phenol. The mixture may further contain various di-substitution products, particularly when higher molar ratios are used. While the term "styrenated" is used to describe the reaction of styrene with the polyhydric phenol, it will be understood that other aromatic olefins can be used, as more fully described below. Within the above molar ranges, higher amounts of the aromatic olefin and the N-methylol lactam will result in the styrenated polyhydric phenol-N-methylol lactam derivative as the predominant structure, as determined by spectroscopic analysis. Also present in the second reaction product are various structures resulting from the decomposition of the N-methylol group. Amounts of reaction and decomposition products will vary depending on the exact molar ratios used and the reaction conditions.

The polyhydric phenols of the present invention include, but are not limited to, resorcinol, catechol, dihydroxybiphenyl, trihydroxybiphenyl, hydroquinone, alkylidenebisphenols or thio-bisphenols. The alkylidene group of the alkylidenebisphenols can have from about 1 to 12 carbon atoms. The alkylidenebisphenols include, but are not limited to, 4,4'-methylenediphenol (bisphenol F), and 4,4'-isopropylidenediphenol (bisphenol A). Also within the scope of the present invention are polyhydric phenols that are substituted by at least one of the groups including an alkyl group having from about 1 to 12 carbon atoms, an aralkyl group having from about 6 to 12 carbon atoms, an alkanoyl group having from about 2 to 18 carbon atoms, an aroyl group having from about 7 to 11 carbon atoms or a halogen selected from the group consisting of chlorine and bromine. Preferred are dihydric phenols; most preferred is resorcinol.

The aromatic olefinic compounds as used in the present invention

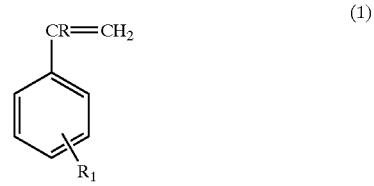

(1)

include any aromatic olefinic compounds of the general formula (1)

wherein R is selected from the group consisting of H and $CH_3$ and $R_1$ is independently selected from the group consisting of H, OH, an alkyl group having from 1 to 6 carbons, a halogen and —CH=$CH_2$. Preferably, the aromatic olefinic compound is an aromatic vinyl compound including alpha-methylstyrene, p-methylstyrene, alpha-chlorostyrene, styrene, divinylbenzene and vinyl napthalenes. Most preferred is styrene.

N-methylol caprolactam and N-methylol butyrolactam are the preferred N-methylol lactams for use in creating the methylene acceptor of the present invention. The N-methylol caprolactam and the N-methylol butyrolactam are represented by the following formulas (2) and (3), respectively:

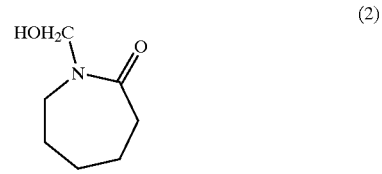

(2)

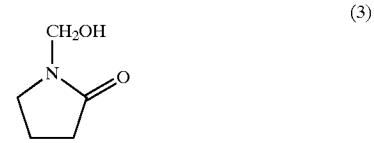

(3)

Also included within the scope of the present invention are the N-methylol lactams represented by the following chemical formulas: N-methylol propiolactam (formula 4); N-methylol valerolactam (formula 5); and N-methylol heptalactam (formula 6), which can also be used to create the low molecular weight methylene acceptor:

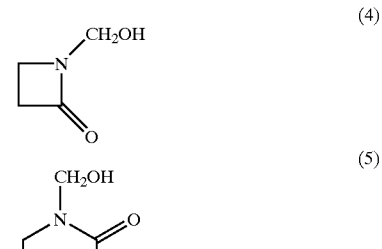

(4)

(5)

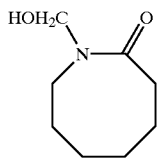

(6)

Unlike formaldehyde, these monofunctional molecules will react with the polyhydric phenol to produce a simple substitution product. Crosslinking of the aromatics is avoided, leading to a blend of low molecular weight derivatives having low free polyhydric phenol, a low softening point and other desired properties for rubber processing.

As described above, the low molecular weight methylene acceptor will comprise the blend of compounds listed above. In a preferred embodiment, resorcinol is used as the polyhydric phenol, styrene is the aromatic olefin and an N-methylol lactam derivative is used (as described above, N-methylol caprolactam and N-methylol butyrolactam are the preferred). The predominant reaction product is a styrenated resorcinol lactam derivative and is represented by the following chemical formula (7):

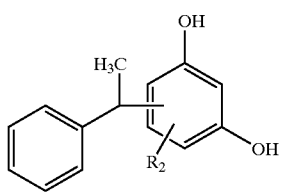

(7)

wherein $R_2$ is an N-methylene lactam group and is represented by the formula:

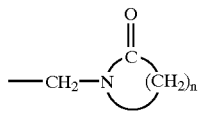

and n=2–6.

The molecule may also be di-substituted; as described above, the reaction mixture may contain a variety of other compounds in varying amounts.

The reaction of the polyhydric phenol with the aromatic olefinic compound according to the methods of the present invention is preferably carried out in the presence of an acid catalyst. Suitable catalysts include, but are not limited to, $H_2SO_4$, $H_3PO_4$, aromatic and aliphatic sulfonic acids, and the like. The preferred catalyst is p-toluenesulfonic acid (PTSA). Typically, the reaction should take place at a temperature of between about 80° and 180° C., preferably between about 125° and 135° C. The reaction time is between about 2 to 5 hours, preferably about 2–3 hours. The second phase of the reaction, the reaction of the lactam derivative with the first reaction product, occurs at a temperature of between about 80° and 120° C. The reaction time is between about ½ to 3 hours, preferably between about ½ to 1½ hours.

In a preferred embodiment of the method of the present invention, resorcinol is reacted with styrene in the presence of a PTSA catalyst. The reaction is performed at a temperature of between about 125°–135° C. for a period of between about 2½ to 3 hours. N-methylol caprolactam is then added slowly to the reaction mixture while maintaining the temperature at between about 95° to 120°, for a period of between about ½ to 1½ hours.

The present invention is further directed to a vulcanizable rubber composition having improvements in physical and mechanical properties such as dynamic stiffness, hardness, scorch safety and cure time. The vulcanizable rubber composition of the present invention comprises: (a) a rubber compound selected from natural rubber, synthetic rubber or combinations thereof; (b) a methylene donor; and (c) a methylene acceptor. The rubber composition will also contain other additives. The methylene acceptor is prepared by reacting a polyhydric phenol with an aromatic olefin in the presence of an acid catalyst to produce a first reaction product, followed by further reacting the first reaction product with an N-methylol lactam derivative, such as propiolactam, butyrolactam, valerolactam, caprolactam, and heptalactam, to produce a second reaction product. Thus, the second reaction product is the low molecular weight methylene acceptor prepared by the above-described methods.

Any suitable methylene donor can be used. Preferred are 2-nitro-2-methyl-1-propanol, hexamethylenetetramine (HMTA), di-, tri-, tetra-, penta-, or hexa-N-methylol-melamine or their partially or completely etherified or esterified derivatives, for example hexamethoxymethylmelamine (HMMM).

Typically, the methylene acceptor is incorporated into the rubber compound in an amount ranging from about 1 to 25 parts by weight based on 100 parts by weight of rubber hydrocarbon (1 to 25 phr). Preferably, the methylene acceptor is incorporated into the rubber compound in an amount from about 1 to 5 phr.

Generally, the weight ratio of methylene acceptor to methylene donor is from about 1:10 to 10:1, more preferably 1:3 to 3:1.

In a preferred embodiment, a vulcanizable rubber composition is provided as described above wherein the methylene acceptor is prepared by reacting resorcinol with styrene in the presence of PTSA to produce a first reaction product, followed by further reacting the first reaction product with N-methylol caprolactam to produce a second reaction product which is the methylene acceptor.

It will be understood by those skilled in the art that the vulcanizable rubber composition of this invention may also include at least one additive comprising sulfur, carbon black, zinc oxide, silica, an anti-oxidant, a stearate, an accelerator, an oil or an adhesion promoter.

In another embodiment of this invention, a vulcanizable rubber composition is provided as described above, further comprising (d) a reinforcing material. Any reinforcing material known in the art can be used, including, but not limited to, nylon, rayon, polyester, aramid, glass, steel (brass, zinc or bronze plated) or other organic and inorganic compositions. These reinforcing materials may be in the form of filaments, fibers, cords or fabrics.

Following formation of the rubber compound, vulcanization can be carried out by methods known in the art.

It will be appreciated that the resin formed by the reaction of the methylene acceptor and methylene donor as described above promotes adhesion between the rubber and the reinforcing materials while simultaneously providing an improvement in the rubber vulcanizate properties such as hardness and dynamic stiffness, as well as improving scorch safety time and providing longer cure times when compared to the prior art. The rubber composition of the present invention further has improved adhesion properties for adhering rubber to the reinforcing materials as described above. Optionally, the reinforcing material can be pretreated or coated with adhesives.

EXAMPLES

The following examples are intended to illustrate the invention, and should not be construed as limiting the invention in any way.

Example 1

A 500-ml reaction kettle equipped with a stirrer, thermometer, reflux condenser and an addition funnel was charged with 1.0 mole (110.1 grams) of resorcinol and heated to 120–130° C. P-Toluene sulfonic acid (PTSA, 1.0 gram) was then added and mixed for 5 minutes. Then 0.8 mole (83.3 grams) of styrene was added slowly over a period of about 90 minutes. The temperature of the reaction mixture was maintained between 125–135° C. during the styrene addition. After all styrene was added, the reaction mixture was maintained at this temperature for an additional 60–90 minutes. Then 0.75 mole (143.3 grams of 75 weight percent aqueous solution) of N-methylol caprolactam was added slowly into the kettle over a period of 60–90 minutes at 95–120° C. The reaction mixture was held at this condition for an additional period of 60–90 minutes. Finally, 0.5 gram of 50% aqueous sodium hydroxide solution was added and the resin was dehydrated under vacuum (28" Hg) at 155–160° C. to remove the distillate. The resulting resin had a softening point of 89.4° C. and a free resorcinol content of 0.7 weight %. Molecular weight determined by the VPO (Vapor Pressure Osmometer) method indicated $\overline{M}n=329$ (number average molecular weight).

Examples 2 Through 6

The procedure of Example 1 as repeated in Examples 2 through 6 varying the amounts of styrene and N-methylol caprolactam used. The softening points, free resorcinol content and number average molecular weight ($\overline{M}n$) of the resulting derivatives are shown in Table 1.

As can be seen from the experimental results of Table 1, low free resorcinol containing derivatives with softening points in the range of 77–100° C. were synthesized. The low melting points clearly indicate that high processability can be easily achieved during compounding with these derivatives.

Penacolite® Resin B-1A is a reaction product of resorcinol and formaldehyde with a number average molecular weight ($\overline{M}n$) of 420, which indicates that at least 3–4 resorcinol units are joined together.

Penacolite® Resin B-20-S is a styrenated resorcinol-formaldehyde resin with $\overline{M}n=450$. In the synthesis of B-20-S resin, resorcinol was allowed to react with styrene first before the formaldehyde reaction. The molecular weight determination performed on the derivatives of this invention clearly indicates lower molecular weight compared to the commercial Penacolite Resins (B-1A and B-20-S). Since these lower molecular weight derivatives are expected to be distributed uniformly in the rubber compounds at 125° C. processing temperature conditions, a low uncured rubber compound viscosity similar to resorcinol (molecular weight=110) can be expected. Due to low uncured rubber compound viscosity, excellent extrusions of these compounds are possible.

Example 7

Thermogravimetric Analysis

Fuming of resorcinol, its derivatives and resins at internal-mixer temperatures above 110° C. is associated with the volatile products obtained from either the unreacted resorcinol and its compounds or their decomposition products. One way to determine the volatility of a material is to run a thermogravimetric analysis (TGA). Table 2 shows TGA results of resorcinol, Penacolite Resin B-20-S and the derivatives of the present invention. Analysis was performed in a nitrogen atmosphere at 10° C./minute heating rate.

From the results of Table 2, it is clear that the derivatives of this invention produced very low volatiles at elevated temperatures when compared to resorcinol. Interestingly, in percent weight loss at 125°, 150° and 175° C., the derivatives of the present invention are close to the percent weight loss seen with the Penacolite Resin B-20-S, also a low fuming resin.

Example 8

Rubber Testing

The derivatives prepared according to examples of this invention were evaluated in a black natural rubber compound to assess and compare its performance against resorcinol and Penacolite® Resin B-20-S for uncured rubber compound viscosity, steel-wire adhesion properties and cured rubber dynamic properties. Black natural rubber compositions, having the formulation shown in Table 3, were prepared in a 3-stage mixing procedure. These rubber compositions were then used to evaluate the adhesion and reinforcing effects of the resorcinol compounds of this invention as methylene acceptors in combination with the methylene donor hexamethoxymethylmelamine (HMMM). The methylene donor/methylene acceptor ratio as kept constant at 1:1 ratio with combined loadings of 4 parts by weight in the rubber compound.

The rubber masterbatch was mixed in the first stage to about 150° C. in a Banbury mixer. In a second stage, a methylene acceptor prepared according to the methods of this invention and a cobalt salt were mixed into an appropriate amount of the masterbatch on the two-roll mill at about 121° C. The insoluble sulfur, accelerator and appropriate amount of HMMM as indicated in Table 3 were mixed in the third stage at 95° C. The test compounds were conditioned overnight in a constant temperature room at about 23° C. and 50% relative humidity. The compounds were then tested for Rheometer cure, shaped and optimum cured at 150° C. for the evaluation of wire adhesion and mechanical properties.

Cure properties were measured with an Alpha Technologies MDR2000 Rheometer at 150° C., 0.5° arc and 1.67 Hz according to ASTM D-5289. Wire pullout adhesion was determined for each test compound by ASTM D-2229 using 3×0.2+6×0.35 mm brass plated steel cored with 63.5% copper plating embedded in 19.0 mm in the rubber pad. Dynamic mechanical properties were determined with a Rheometrics Scientific mechanical spectrometer at 0.2 and 2.0% torsional shear strain at 1 Hz and 23° C.

The commercial methylene acceptors, resorcinol and Penacolite Resin B-20-S and the methylene acceptor of the present invention, prepared according to Example 1, were each combined with methylene donor HMMM and evaluated for cure, wire adhesion and mechanical properties, as discussed above. The test data are given in Table 4.

As can be seen from the table, Compound C made from the Example 1 methylene acceptor was observed to have the many advantages. The uncured rubber compound viscosity (as determined from the Rheometer cure $M_L$ value measured at 125° C.) is close to resorcinol compared to Penacolite B-20-S resin. This is due to a lower molecular weight ($\overline{M}n=329$) compared to Penacolite resin ($\overline{M}n=450$). Though the uncured rubber compound viscosity with lower molecular weight methylene acceptor, such as resorcinol (molecular weight=110) is difficult to achieve, the methylene acceptors of the present invention provide such low viscosity.

Additional advantages in the initial, steam and humidity aged wire adhesion properties of Compounds C and D, which were comparable to the control, resorcinol. Compounds C and D had similar tensile properties and hysteresis (tangent delta) as compared with resorcinol, and had a higher dynamic stiffness (G') than the resorcinol control.

Example 9

Additional Rubber Testing

The derivatives prepared according to Examples 2 to 5 of this invention were evaluated as in Example 8. The insoluble sulfur used in the final stage of rubber compound mixing was 5.0 parts by weight (80% active). Resorcinol was used at 2.0 part loading whereas the resins were used at 3.0 part loading.

Table 5 illustrates the cure behavior, wire adhesion, physical and mechanical properties of the cured rubber compounds. It is clear from Table 5 that the methylene acceptor of the present invention showed uncured rubber compound viscosity ($M_L$ from MDR Rheometer cure at 125° C. and 150° C. temperatures) similar to resorcinol. Compared to resorcinol, Penacolite Resin B-20-S showed a higher uncured rubber compound viscosity. These results clearly indicate that the uncured rubber compound viscosity can be achieved with lower molecular weight derivatives produced by the methods of the present invention.

Though the derivatives of this invention showed wire adhesion and tensile properties similar to resorcinol, significant improvement in properties such as dynamic storage modulus (G' at 0.2 and 2.0% strain) was observed. This improved property is associated with the presence of styryl and caprolactam substituents in the resorcinolic derivatives of this invention.

Examples 10 Through 14

Into a 500 ml reaction kettle equipped with a stirrer, thermometer and reflux condenser, 1.0 mole of resorcinol (110.1 grams), 100 ml distilled water and 1.0 grams of p-toluene sulfonic acid (PTSA) were charged and heated to reflux.

Then, 1.2 moles of N-methylol caprolactam (229.2 grams of 75 wt. % aqueous solution) was added for about 90 minutes at reflux condition. After the caprolactam addition, the reflux was continued for an additional 60 minutes. Finally, the aqueous distillate was removed under atmospheric and vacuum conditions to obtain the derivative in the form of a resin solid. The final product showed a softening point of 114.9° C. and free resorcinol content of 2.5 weight percent.

The above procedure was repeated using different molar ratios of resorcinol to N-methylol caprolactam to obtain resorcinolic derivatives with varying amounts of methylene bridged caprolactam substitution. The results of these experiments are shown in Table 6.

As can be seen from the results in Table 6, softening points less than 110° C. and free resorcinol content less than 1.0 weight percent could not be achieved simultaneously from the use of resorcinol and N-methylol caprolactam reactants in the absence of styrenation. Highly processable and very low fuming resorcinolic derivatives can be easily prepared if the styrenation of resorcinol is done before the addition of N-methylol caprolactam in the reaction; it is thought that the N-methylol reaction generates water, which may interfere in the styrenation of resorcinol if styrenation of resorcinol is not done first.

Examples 15 Through 19

A 500 ml resin kettle equipped with a stirrer, thermometer and a reflux condenser was charged with 1.0 mole of resorcinol (110.1 grams) and 1.0 gram of PTSA as catalyst. The mixture was heated to a temperature of 120–125° C. to melt resorcinol. Then, 0.2 mole of N-methylol caprolactam (75 wt. % aqueous solution, 38.2 grams) was added into the resorcinol at reflux condition. After the completion of methylol caprolactam addition, 0.5 mole of aqueous formaldehyde solution (37%, 40.5 grams) was added over a period of 30 minutes. Following this addition, the reaction mixture was stirred for an additional period of 30 minutes at the reflux. Afterwards, 0.5 gram of 50% aqueous NaOH was added to neutralize the PTSA catalyst. Finally, the aqueous distillate was removed under reduced pressure to obtain a resin with a softening point of 121.4° C. and a free resorcinol content of 11.0 weight percent.

This experiment was repeated with different molar ratios of N-methyl caprolactam and formaldehyde. As can be seen from the experimental data shown in Table 7, the resins obtained from these samples were high-fuming with very high softening points as compared with the derivatives prepared by the methods of the present invention as shown in Table 1.

TABLE 1

Synthesis of Resorcinol-Styrene-N-Methylol Caprolactam Derivatives

|  | Example 2 | Example 3 | Example 4 | Example 5 | Example 6 |
|---|---|---|---|---|---|
| Raw Materials (mole) | | | | | |
| Resorcinol | 1.0 | 1.0 | 1.0 | 1.0 | 1.0 |
| Styrene | 0.6 | 1.0 | 0.4 | 1.0 | 0.25 |
| N-Methylol Caprolactum (75 wt. % aqueous) | 0.75 | 0.5 | 0.75 | 0.75 | 1.0 |
| Resin Properties | | | | | |
| Softening Point (° C.) | 89 | 77 | 89 | 90 | 100.4 |
| Free-Resorcinol (wt. % by GC) | 1.6 | 0.9 | 3.3 | 0.3 | 1.8 |
| $\overline{M}n$ (by VPO) | 303 | ND | 277 | ND | 297 |

ND = Not Determined

TABLE 2

Thermogravimetric Analysis (TGA) Results of Resorcinol and Resorcinolic Resins

| Compound (cumulative wt. % loss) | 125° C. | 150° C. | 175° C. | 200° C. | 225° C. |
|---|---|---|---|---|---|
| 1. Resorcinol | 1.7 | 8.5 | 32.6 | 96.4 | 99.1 |
| 2. Penacolite* Resin B-20-S | 0.4 | 0.7 | 1.2 | 2.4 | 4.8 |
| 3. Example 1 | 0.2 | 0.5 | 1.1 | 2.7 | 5.7 |
| 4. Example 4 | 0.3 | 0.6 | 1.6 | 3.7 | 7.7 |
| 5. Example 5 | 0.4 | 0.6 | 1.3 | 2.8 | 5.6 |
| 6. Example 6 | 0.4 | 0.7 | 1.9 | 4.6 | 8.6 |

TABLE 3

Rubber Compound Used in Testing

| Masterbatch | Parts by Weight |
|---|---|
| First Stage | |
| 1. Natural Rubber | 100 |
| 2. Carbon Black (N-326) | 55 |
| 3. Zinc Oxide | 8 |
| 4. Stearic Acid | 1 |
| 5. N-(1,3-Dimethylbutyl)-N'-Phenyl-p-Phenylene Diamine | 2 |
| 6. Pre-vulcanization Inhibitor [N-(Cyclohexylthio) Phthalimide] | 0.2 |
| 7. Polymerized 1,2-Dihydro-2,2,4-Trimethyl Quinoline | 1.0 |
| Second Stage | |
| 8. Methylene Acceptor (Resorcinol Derivative/Resin) | 2.0 |
| 9. Cobalt Salt (Manobond 680C, 22% Co) | 0.45 |
| Third Stage (Final) | |
| 10. Insoluble Sulfur (80% Active) | 7.5 |
| 11. N,N-Dicyclohexyl-2-Benzenethiazole Sulfenamide | 1.0 |
| 12. Methylene Donor (HMMM, 72% Active) | 2.78 |

TABLE 4

Rubber Compound Properties

| Compound | A | B | C | D |
|---|---|---|---|---|
| Methylene Acceptor | Resorcinol | Penacolite B-20-S | Example 1 | Example 2 |
| Donor | HMMM | HMMM | HMMM | HMMM |
| Weight Ratio of Acceptor/Donor, phr | 2:2 | 2:2 | 2:2 | 2:2 |
| Fuming at 120° C. | High | Slight | Slight | Slight |
| Rheometer Cure at 125° C. | | | | |
| $M_L$, dN-m | 2.72 | 3.06 | 2.81 | 2.82 |
| $t_S2$, minutes | 21.49 | 27.72 | 28.47 | 27.91 |
| Rheometer Cure at 150° C. | | | | |
| $M_H$, dN-m | 37.25 | 35.84 | 33.88 | 35.18 |
| $M_L$, dN-m | 2.12 | 2.42 | 2.16 | 2.21 |
| $t_S2$, minutes | 3.09 | 3.25 | 3.52 | 3.45 |
| t'90, minutes | 21.90 | 25.18 | 27.75 | 27.73 |
| Wire Adhesion, N (% Rubber Coverage) | | | | |
| Unaged | 1097 (90) | 1245 (90) | 1144 (90) | 1246 (90) |
| Steam, 24 hours at 120° C. | 1237 (95) | 1262 (95) | 1178 (90) | 1246 (95) |
| Humidity, 21 Days at 85° C./95% R.H. | 757 (70) | 1023 (90) | 1016 (90) | 1090 (85) |
| Dynamic Mechanical | | | | |
| 0.2% Strain | | | | |
| G', MPa | 24.74 | 23.66 | 26.12 | 26.53 |
| Tan Delta | 0.075 | 0.072 | 0.073 | 0.072 |
| 2.0% Strain | | | | |
| G', MPa | 14.79 | 14.78 | 15.94 | 16.31 |
| Tan Delta | 0.211 | 0.193 | 0.216 | 0.209 |
| Shore A Hardness | 85 | 84 | 84 | 83 |
| Tensile Properties | | | | |
| 100% Modulus, MPa | 6.67 | 6.77 | 6.45 | 6.53 |
| Tensile Strength, MPa | 23.26 | 24.05 | 23.40 | 23.70 |
| Elongation, % | 333 | 340 | 349 | 348 |
| Die-C Tear, KN/m | 92.7 | 91.2 | 96.7 | 85.0 |

TABLE 5

Rubber Compound Properties

| Compound | A | B | C | D | E | F |
|---|---|---|---|---|---|---|
| Methylene Acceptor | Resorcinol | Penacolite B-20-S | Example 2 | Example 3 | Example 4 | Example 5 |
| Donor | HMMM | HMMM | HMMM | HMMM | HMMM | HMMM |
| Weight Ratio, Acceptor/Donor, phr | 2:2 | 3:2 | 3:2 | 3:2 | 3:2 | 3:2 |
| Fuming at 120° C. | High | Low | Low | Low | Medium | Low |
| Rheometer Cure at 125° C. | | | | | | |
| $M_L$, dN-m | 2.75 | 3.00 | 2.78 | 2.71 | 2.78 | 2.77 |
| Rheometer Cure at 150° C. | | | | | | |
| $M_H$, dN-m | 33.78 | 32.49 | 30.76 | 29.42 | 32.40 | 27.91 |
| $M_L$, dN-m | 2.25 | 2.53 | 2.25 | 2.22 | 2.26 | 2.25 |
| $t_S2$ minutes | 3.55 | 3.36 | 4.13 | 4.26 | 3.94 | 4.46 |
| t'90, minutes | 18.78 | 20.05 | 23.46 | 23.26 | 22.84 | 24.00 |
| Wire Adhesion, N (% Rubber Coverage) | | | | | | |
| Unaged | 579 (45) | 924 (78) | 821 (70) | 868 (80) | 863 (73) | 733 (65) |
| Steam, 24 hours at 120° C. | 1130 (95) | 1304 (95) | 1265 (95) | 1338 (95) | 1262 (95) | 1268 (95) |
| Humidity, 14 Days at 85° C./95% R.H. | 1063 (90) | 1179 (90) | 1179 (90) | 1259 (90) | 1238 (90) | 1209 (90) |
| Dynamic Mechanical | | | | | | |
| G' at 0.2% Strain, MPa | 22.78 | 24.66 | 28.97 | 27.69 | 29.82 | 26.82 |
| Tan Delta at 0.2% Strain | 0.080 | 0.078 | 0.080 | 0.082 | 0.081 | 0.081 |
| G' at 2.0% Strain, MPa | 13.15 | 14.74 | 16.94 | 16.12 | 17.25 | 15.61 |
| Tan Delta at 2.0% Strain | 0.218 | 0.203 | 0.228 | 0.233 | 0.226 | 0.238 |
| Shore A Hardness | 82 | 84 | 84 | 82 | 85 | 83 |
| Tensile Properties | | | | | | |
| 100% Modulus, MPa | 5.18 | 5.12 | 4.69 | 4.67 | 4.82 | 4.51 |

TABLE 5-continued

Rubber Compound Properties

| Compound | A | B | C | D | E | F |
|---|---|---|---|---|---|---|
| Tensile Strength, MPa | 25.01 | 26.11 | 24.98 | 24.81 | 25.08 | 25.00 |
| Elongation, % | 409 | 429 | 442 | 436 | 435 | 445 |
| Die-C Tear, KN/m | 109.0 | 104.7 | 111.9 | 117.7 | 116.5 | 117.0 |

TABLE 6

Synthesis of N-Methylol Caprolactam-Resorcinol Reaction Product

| Example | 9 | 10 | 11 | 12 | 13 |
|---|---|---|---|---|---|
| Raw Materials (Mole) | | | | | |
| Resorcinol | 1.0 | 1.0 | 1.0 | 1.0 | 1.0 |
| N-Methylol Caprolactam (75 wt. % Aqueous) | 1.20 | 1.25 | 1.3 | 1.4 | 1.5 |
| Derivative/Resin Properties | | | | | |
| Softening Point (° C.) | 114.9 | 116.3 | 120.4 | >130 | >130 |
| Free Resorcinol (wt. % by GC) | 2.5 | 2.2 | 2 | 0.96 | 0.68 |

TABLE 7

Synthesis of Resorcinol-N-Methylol Caprolactam-Formaldehyde Resins

| Example | 14 | 15 | 16 | 17 | 18 |
|---|---|---|---|---|---|
| Raw Materials (Mole) | | | | | |
| Resorcinol | 1.0 | 1.0 | 1.0 | 1.0 | 1.0 |
| N-Methylol Caprolactam (75 wt. % Aqueous) | 0.2 | 0.4 | 0.6 | 0.8 | 0.25 |
| Formaldehyde (37% Aqueous) | 0.5 | 0.4 | 0.3 | 0.2 | 0.5 |
| Resin Properties | | | | | |
| Softening Point (° C.) | 121.4 | 120.9 | 114 | 112.3 | 127.5 |
| Free Resorcinol (wt. % by GC) | 11.0 | 6.5 | 6.4 | 5.7 | 10.0 |

What is claimed is:

1. A vulcanizable rubber composition comprising:

(a) a rubber compound selected from natural rubber, synthetic rubber or combinations thereof;

(b) a methylene donor; and (c) a methylene acceptor; wherein said methylene acceptor is represented by the chemical formula:

(7)

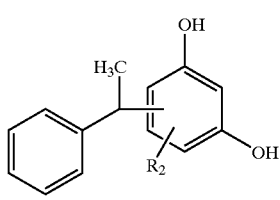

where $R_2$ is an N-methylene lactam group and is represented by the formula:

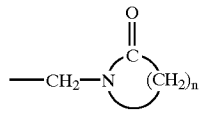

and n=2–6.

2. The rubber composition of claim 1, wherein said polyhydric phenol is resorcinol.

3. The rubber composition of claim 1, wherein said aromatic olefinic compound is selected from the group consisting of styrene, alpha-methylstyrene, p-methylstyrene, alpha-chlorostyrene, divinylbenzene and vinyl naphthalenes.

4. The rubber composition of claim 3, wherein said aromatic olefinic compound is styrene.

5. The rubber composition of claim 1, wherein the N-methylol lactam derivative is selected from the group consisting of N-methylol propiolactam, N-methylol butyrolactam, N-methylol valerolactam, N-methylol caprolactam and N-methylol heptalactam.

6. The rubber composition of claim 5, wherein said N-methylol lactam derivative is N-methylol caprolactam.

7. The rubber composition of claim 1, wherein said methylene acceptor is incorporated into said rubber compound in an amount from about 1 to 25 parts by weight based on 100 parts by weight of rubber compound.

8. The rubber composition of claim 7, wherein said methylene acceptor is incorporated into said rubber compound in an amount from about 1 to 5 parts by weight based on 100 parts by weight of rubber compound.

9. The rubber composition of claim 1, wherein the weight ratio of methylene acceptor to methylene donor is between about 1:10 to 10:1.

10. The rubber composition of claim 1, wherein said methylene donor is selected from the group consisting of hexamethylenetetramine, di-, tri-, tetra-, penta- or hexa-N-methylol-melamine, 2-nitro-2-methyl-1-propanol and hexamethoxymethylmelamine.

11. The rubber composition of claim 1, further comprising a reinforcing material.

12. The rubber composition of claim 11, wherein said reinforcing material is selected from the group consisting of nylon, rayon, polyester, aramid, glass, and steel.

13. The rubber composition of claim 12, wherein said reinforcing material is in the form of filaments, fibers, cords or fabrics.

14. The rubber composition of claim 1, further comprising at least one additive selected from the group consisting of sulfur, carbon black, zinc oxide, silica, an anti-oxidant, a stearate, an accelerator, an oil and an adhesion promoter.

15. A resorcinol derivative having the following chemical formula:

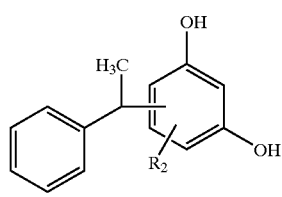
(7)
where R₂ is an N-methylene lactam group and is represented by the formula:
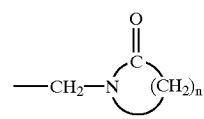
and n=2–6.
16. The resorcinol derivative of claim 15 wherein n=3.
17. The resorcinol derivative of claim 15 wherein n=5.
* * * * *